No. 644,496. Patented Feb. 27, 1900.
C. A. CLARK
HORSE POWER FOR UNLOADING HAY.
(Application filed Nov. 11, 1899.)
(No Model.)
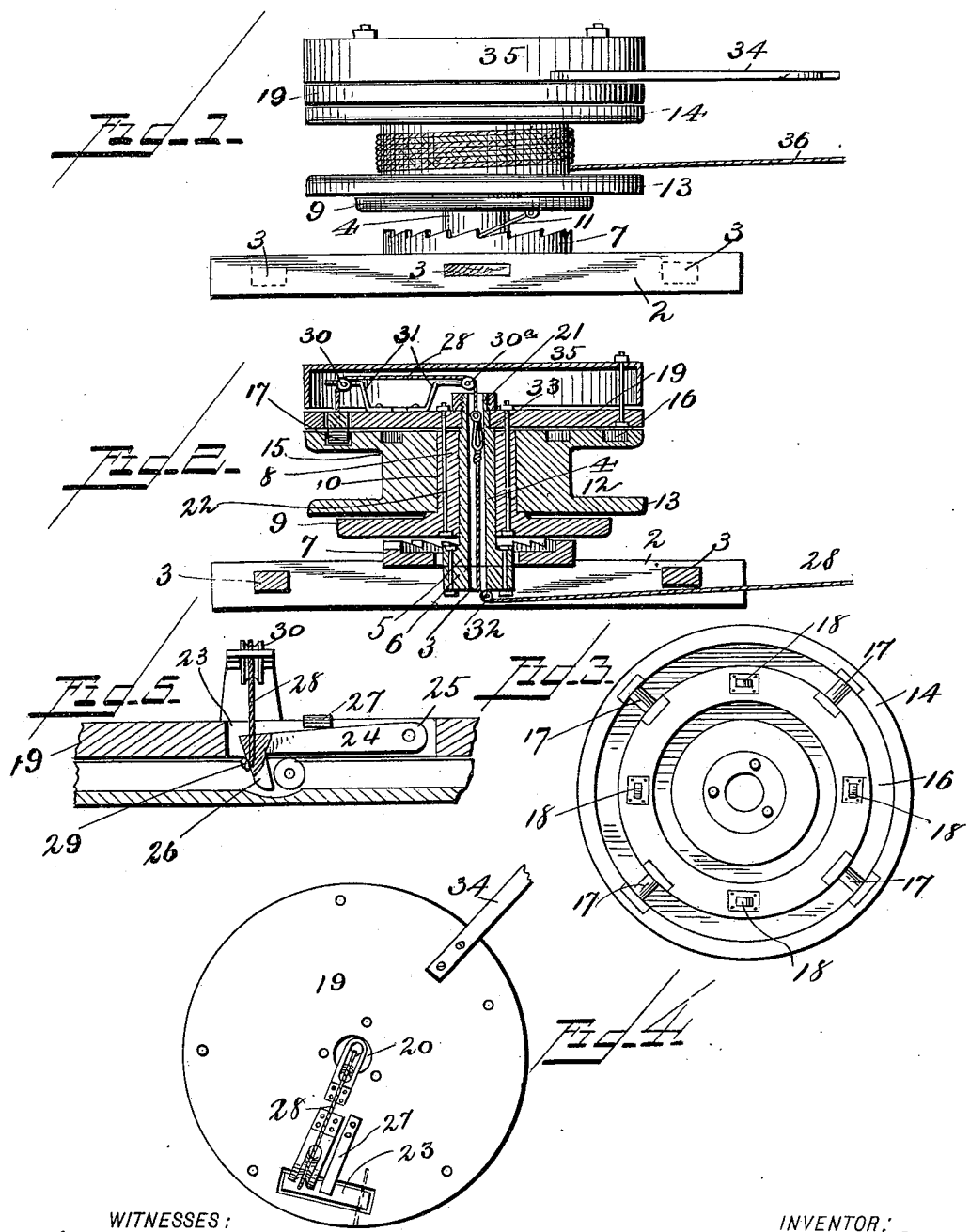

UNITED STATES PATENT OFFICE.

CHARLES A. CLARK, OF FLINT, MICHIGAN, ASSIGNOR OF ONE-HALF TO FREDERICK J. OTTAWAY, OF SAME PLACE.

HORSE-POWER FOR UNLOADING HAY.

SPECIFICATION forming part of Letters Patent No. 644,496, dated February 27, 1900.

Application filed November 11, 1899. Serial No. 736,633. (No model.)

*To all whom it may concern:*

Be it known that I, CHARLES A. CLARK, a citizen of the United States, residing at Flint, in the county of Genesee and State of Michigan, have invented new and useful Improvements in Horse-Powers for Unloading Hay, &c., of which the following is a specification.

My invention relates to capstans or winding-drums for horse-powers; and the objects of the same are to provide simple and efficient means for loading and unloading hay and for other purposes which shall be provided with improved devices to permit the drum to be revolved in one direction to elevate the hay or other material and to cause said drum to be released to unwind or lower the material, said devices consisting of tripping mechanism to be operated by a cord or rope under control of an operator at any suitable distance from the drum. I attain these objects by means of the mechanism illustrated in the accompanying drawings, which form a part of this specification, and in which—

Figure 1 is a side view of my invention. Fig. 2 is a central vertical section of the same. Fig. 3 is a top plan view of the drum or spool. Fig. 4 is a similar view of the disk which carries the tripping mechanism. Fig. 5 is a vertical section through the disk and through the upper flange of the drum or spool.

Like numerals of reference designate like parts wherever they occur in the different views of the drawings.

The numeral 1 designates the support or base for my winding mechanism, said support consisting of the longitudinal bars 2 and the cross-bars 3.

Rigidly secured to the central cross-bar 3 is a tubular standard 4, having a flanged base 5, bolted to said cross-bar at 6. Surrounding this standard and also attached to the central cross-bar 3 is a ratchet-plate 7. A hub 8, having a bottom disk 9 and a projecting sleeve 10, carries a pawl 11 on its under face, which engages the teeth on the ratchet-plate 7. The sleeve 9 fits over the standard 4 and is mounted to revolve thereon.

The drum or spool 12 consists of the two flanges 13 and 14 and a central connecting-reel 15. This reel is bored centrally to fit the hub 8 and is adapted to revolve thereon. The flange 14 has a groove 16 in its upper surface, and a series of rollers 17 are journaled in the side walls of said groove. These rollers extend across the groove, and their peripheries are slightly below the upper surface of the flange 14, and their purpose is to serve as catches for a dog connected to a superposed tripping-disk. Journaled in recesses in the upper face of the flange 14 are a series of rollers 18, and the peripheries of these rollers project slightly above the face of the flange to serve as roller-bearings to reduce the friction between the drum and the tripping-disk.

The tripping-disk 19 is provided with a central aperture 20, which fits the reduced upper end of the tubular standard 4 and is mounted to revolve thereon. A threaded nut 21 is turned onto the upper reduced end of the standard to hold the disk 19 in place. Bolts 22 pass through the disk 19 and through the sleeve 10 of the hub 8, securing these parts firmly together. The disk 19 has an aperture 23 near its periphery, and a dog 24 is pivoted at 25 in this aperture. This dog has a nose 26, which normally rests in the groove 16 and is held therein by the spring 27, secured to the disk and having its free end lying over the groove and on the dog. A cord or cable 28 is attached to the dog at 29 and from thence extends upward over pulleys 30 30ᵃ, journaled in brackets 31, secured to the upper face of the disk 19. From the pulley 30ᵃ the cord or cable 28 extends down through the tubular standard 4 and cross-bar 3 and out under a pulley 32, journaled in the central cross-bar 3. At a suitable point within the tubular standard the cord or cable is provided with a swivel 33, which prevents the cord or cable 28 from becoming twisted or tangled to interfere with its operation. This cord or cable is of a sufficient length to extend to any suitable point to be operated to release the drum and to permit the load to be lowered, as will be presently described.

A sweep or lever 34 is secured to the disk 19 and projects outward therefrom and may be provided with means for attaching a draft-animal, if desired, although for some classes of work the sweep may be operated by hand.

A cover 35 is attached to the disk 19 and serves to conceal and protect the tripping mechanism.

The operation of my invention is as follows: As shown in Fig. 1, the sweep or lever 34 is actuated by any suitable power, and said sweep carries with it the cover, the disk 19, the drum or spool 12, and the hub 8, winding the rope 36 upon the spool or drum 12, and the pawl 11 engages the ratchet-plate 7 to prevent retrograde movement of said parts. The nose 26 of the dog 24 engages one of the rollers or catches 17 when the parts are rotated in the winding direction and holds the spool or drum 12 from backward rotation. When the load has been elevated to the required height, the operator pulls the cord or cable 28 and lifts the dog 24 out of the path of the catches or rollers 17, and the drum is then free to rotate by the weight of the load. When the load has been deposited, the hay fork or grapple is lowered again and attached to another load, which is elevated as described and the tripping mechanism operated to deposit it.

I am aware that certain changes may be made in the details of my invention without departing from the spirit and scope thereof. Hence I do not wish to be understood as being limited to the exact construction shown.

Having thus fully described my invention, what I claim is—

1. The combination, with the tubular standard, the ratchet-plate and pawl, the hub, the disk secured thereto, the drum, the rollers on the upper flange of said drum, the annular groove therein and the roller-catches journaled in said groove, the spring-dog, the cord or cable, the pulleys and the swivel, said cord or cable passing through the tubular standard, substantially as described.

2. The combination, with the standard having a central hole and screw-threaded upper end, the rotatable hoisting-drum, having an annular groove on its upper face and the catches located therein, of the rotatable disk the dog pivoted thereto, the brackets and pulleys, and the rope or cord secured to said dog and passing around said pulleys and through the hole in the standard, substantially as described.

3. The combination, with the bracket, the standard having a central hole and a screw-threaded upper end, the rotatable drum having a flange at its lower edge and an annular groove on its upper face, and the catches, of the rotatable disk, the antifriction-rollers journaled in brackets secured to said disk, the pivoted dog, and the cord or rope secured to said dog and passing over said pulleys and through the hole in the standard, substantially as described.

In testimony whereof I have hereunto set my hand in presence of two subscribing witnesses.

CHARLES A. CLARK.

Witnesses:
WM. D. SKINNER,
ETHEL JENNEY.